United States Patent
Zehnder et al.

[11] 3,951,446
[45] Apr. 20, 1976

[54] CAR TRUNK LITTER RECEPTACLE

[76] Inventors: Fred. W. Zehnder; George Spector, both of 3615 Woolworth Bldg., 233 Broadway, New York, N.Y. 10007

[22] Filed: Sept. 18, 1974

[21] Appl. No.: 506,944

[52] U.S. Cl. .................... 296/37 R; 232/37
[51] Int. Cl.² ............................ B60N 3/08
[58] Field of Search ............ 296/37 R; 224/29; 131/242, 231; 232/1 R, 36, 37; 15/313

[56] References Cited
UNITED STATES PATENTS

| | | | |
|---|---|---|---|
| 1,568,901 | 1/1926 | Mickey | 224/29 |
| 1,817,288 | 8/1931 | Benjamin | 224/29 |
| 1,951,991 | 3/1934 | Patterson | 224/29 |
| 2,081,559 | 5/1937 | Punke | 224/29 |
| 2,653,741 | 9/1953 | Senk | 224/42.42 |
| 2,920,756 | 1/1960 | Evenson | 224/29 |
| 3,247,953 | 4/1966 | Gielow | 224/29 |
| 3,341,116 | 9/1967 | Lewis | 232/43.2 |
| 3,640,286 | 2/1972 | Wellnitz | 131/242 |

Primary Examiner—Robert J. Spar
Assistant Examiner—L. J. Paperner

[57] ABSTRACT

A receptacle built into a trunk compartment of an automobile; the receptacle being accessible by passengers in the car interior by means of a trap door behind the rear seat, so to conveniently allow disposal of litter while traveling instead of tossing it out on the highway and be subject to a fine.

2 Claims, 5 Drawing Figures

U.S. Patent   April 20, 1976   3,951,446
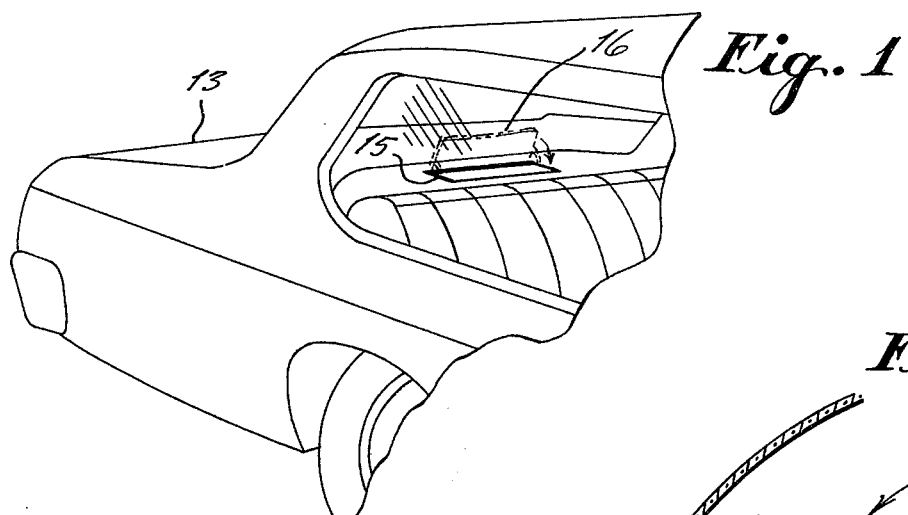
Fig. 1
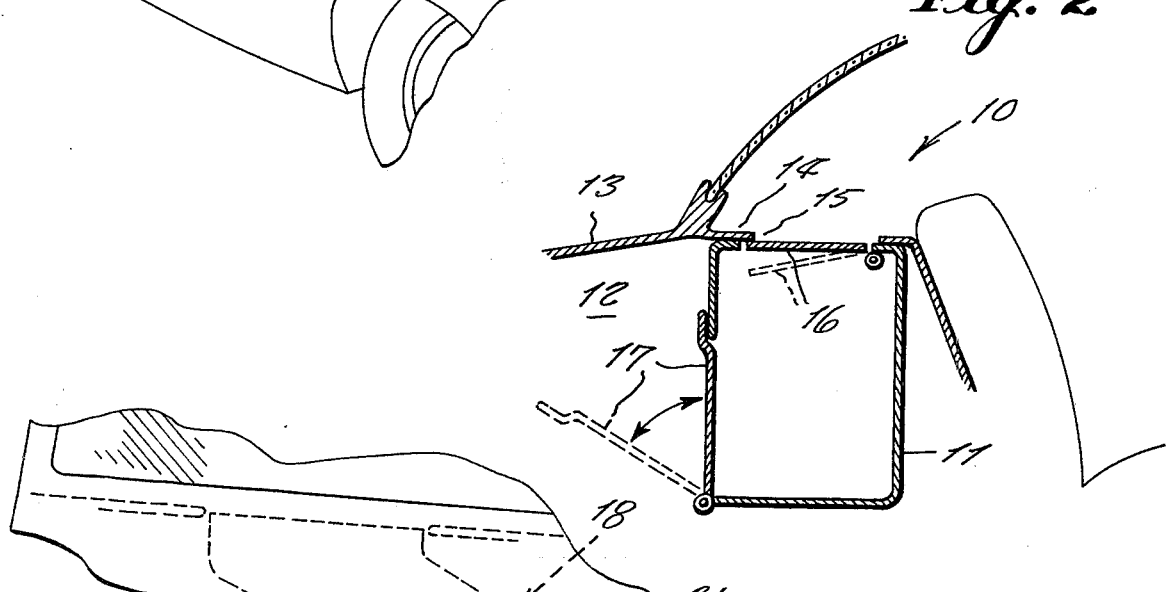
Fig. 2
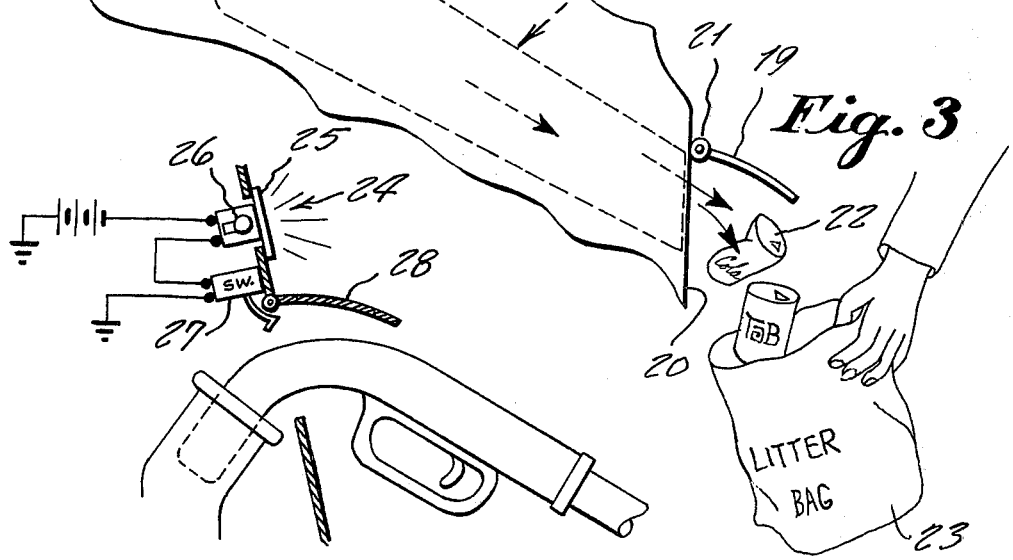
Fig. 3
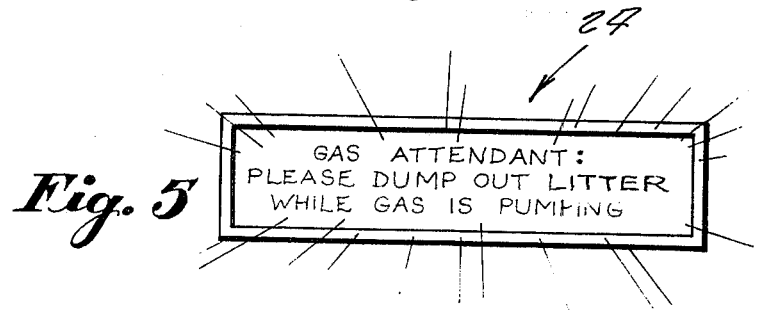
Fig. 4
Fig. 5
GAS ATTENDANT:
PLEASE DUMP OUT LITTER
WHILE GAS IS PUMPING

CAR TRUNK LITTER RECEPTACLE

This invention relates generally to passenger automobiles. More specifically it relates to an automobile litter receptacle.

A principal object of the present invention is to provide a car trunk litter receptacle that eliminates refuse being kept inside a car while traveling so that the car interior is neat and tidy for the passengers at all times.

Another object is to provide a car trunk litter receptacle that stops passengers from tossing litter out of a moving car along a highway thus preserving the highway in a beautified condition.

Still another object is to provide a car trunk litter receptacle that is built into a car so to eliminate loose litterbags laying underfoot upon a car floor.

Other objects are to provide a car trunk litter receptacle which is simple in design, inexpensive to manufacture, rugged in construction, easy to use, and efficient in operation.

These and other objects will be readily evident upon a study of the following specification and the accompanying drawing wherein:

FIG. 1 is a perspective view of the invention as viewed on the car interior.

FIG. 2 is an enlarged side cross sectional view thereof.

FIG. 3 is a fragmentary rear view of a car showing a modified design of the invention in which the refuse bin can be opened from a side of the car by a separate door, thus eliminate the need to go into the trunk; this form of the invention being made primarily so a service station attendant cleans out the bin when a car stops for gas.

FIG. 4 is a further structure for the design shown in FIG. 3, wherein when the service station attendant inserts a gas pump nozzle in the gas tank filler line, the opened door closes a circuit to light up an instruction panel above the door for gaining the attendant's attention.

FIG. 5 is a front view of the instruction panel mentioned in the FIG. 4 description, and which asks the man to please clean out the refuse bin.

Referring now to the drawing in detail and more particularly to FIGS. 1 and 2 thereof at this time, the reference numeral 10 represents a car trunk litter receptacle according to the present invention wherein an easily cleanable plastic receptacle 11 is placed inside a trunk compartment 12 of a car 13, and which may be stationarily supported or secured immediately under a rear window sill 14. The sill has a 5 by 10 inches opening 15 therethrough so to provide access for depositing litter directly into the receptacle. A spring loaded door 16 can be maintained in open position along a rear edge of the opening 15 so to serve as a back stop for litter being tossed from a front seat of the car into the opening.

The receptacle includes a spring loaded trap door 16 under the opening 15 in order to prevent litter odors entering the passenger area, if wished.

The receptacle also includes a spring loaded, rear lower door 17 accessible inside the trunk compartment for cleaning out the litter from the receptacle.

In operative use, it is now evident that a convenient litter receptacle is provided that is more neat than a refuse bag placed upon a car floor and which completely removes litter out of the passenger compartment.

In FIGS. 3 to 5, a modified design of car trunk litter receptacle 18 is shown which has the advantage that it can be cleaned out without need to get into the car trunk compartment, because the receptacle is downwardly angularly inclined in shape and has a dumping door 19 along a side wall 20 of the car, so that as shown in FIG. 3, when the door is pivoted up about a hinge 21, the refuse 22 slides out automatically into a pick up bag 23, thus quickly and easily completely cleaning out the litter receptacle.

If prefered, a vehicle manufacturer can additionaly incorporate an instruction sign 24 directly above the gasoline intake pipe where it will be noticed by a gasoline service station attendant when he is pumping gasoline into the car.

The instruction sign 24 consists of a transparent, tinted window 25 with the following text imprinted thereupon: "Gas Attendant: Please dump out litter while gas is pumping". Thus while waiting for the tank to fill, the attendant can within a few seconds of time also clean out the litter.

The above text is automatically illuminated to catch the attendant's attention by a lamp 26 behind the window which is in series circuit with a switch 27 that is closed when the gasoline filler pipe door 28 is pivoted open. After the door 28 is closed again, the lamp 26 automatically goes out.

Thus a modified design of the invention is provided.

While various changes may be made in the detail construction, it is understood that such changes will be within the spirit and scope of the present invention as is defined by the appended claims.

What is claimed is:

1. A litter receptacle for an automotive vehicle having a trunk compartment, said receptacle being secured within said compartment, said vehicle having a horizontal rear window sill with an opening therethrough, said reciptacle having an upper aperture aligned with and adjacent to said opening, including a back stop hinged to the sill adjacent the rear of said opening, said back stop being maintained in the open position by resilient means, further including a trap door pivotally mounted on the receptacle in the aperture and adapted to close the sill opening, said door including spring means for maintaining the door in a normally closed position, said receptacle having a rear vertical wall with spring closed closure for litter removal.

2. A device as in claim 1 in combination with an electrically illuminated sign mounted on the vehicle above a gasoline filler pipe door including an electric circuit providing electricity for the sign, said circuit having a normally open switch mounted on the vehicle for coaction with the filler pipe door, whereby said switch is moved to closed position when the filler pipe door is opened to accept the gas pump nozzle.

* * * * *

UNITED STATES PATENT OFFICE
CERTIFICATE OF CORRECTION

Patent No. 3951446            Dated April 20, 1976

Inventor(s) Fred W. Zehnder, et al

It is certified that error appears in the above-identified patent and that said Letters Patent are hereby corrected as shown below:

Change address of Inventor to:

(76)      FRED W. ZEHNDER

590 FREDERICK STREET

FRANKENMUTH, MICHIGAN 48734

Signed and Sealed this

Fourteenth Day of September 1976

[SEAL]

Attest:

RUTH C. MASON
*Attesting Officer*

C. MARSHALL DANN
*Commissioner of Patents and Trademarks*